(12) United States Patent
Petrovic

(10) Patent No.: US 7,111,723 B2
(45) Date of Patent: Sep. 26, 2006

(54) CONVEYING UNIT WITH CONTAINER ACCUMULATION

(75) Inventor: Zmaj Petrovic, Octeville sur Mer (FR)

(73) Assignee: SIDEL, Octeville sur Mer (FR)

( * ) Notice: Subject to any disclaimer, the term of this patent is extended or adjusted under 35 U.S.C. 154(b) by 0 days.

(21) Appl. No.: 11/183,740

(22) Filed: Jul. 19, 2005

(65) Prior Publication Data
US 2006/0011451 A1    Jan. 19, 2006

Related U.S. Application Data

(60) Provisional application No. 60/589,011, filed on Jul. 20, 2004.

(30) Foreign Application Priority Data

Jul. 19, 2004   (FR) ...................... PCT/FR04/01909

(51) Int. Cl.
*B65G 47/68* (2006.01)
(52) U.S. Cl. .................... 198/452; 198/442; 198/347.1
(58) Field of Classification Search ............ 198/347.1, 198/347.4, 452, 453, 442, 462.1, 462.3, 419.2
See application file for complete search history.

(56) References Cited

U.S. PATENT DOCUMENTS

| 2,571,790 | A | * | 10/1951 | Tomkins ................... 198/419.2 |
| 3,552,537 | A | * | 1/1971 | Vamvakas ................... 198/442 |
| 3,650,371 | A | * | 3/1972 | Constable et al. ........ 198/347.1 |
| 4,142,636 | A | * | 3/1979 | Planke ........................ 198/452 |
| 4,308,944 | A | * | 1/1982 | Probst ......................... 198/442 |
| 4,496,040 | A | * | 1/1985 | Kronseder et al. ......... 198/434 |
| 4,623,059 | A |   | 11/1986 | Agnew |
| 6,168,005 | B1 | * | 1/2001 | Petrovic .................. 198/347.4 |
| 6,959,802 | B1 | * | 11/2005 | Garvey .................... 198/347.1 |

FOREIGN PATENT DOCUMENTS

WO    WO 00/41955    7/2000

* cited by examiner

*Primary Examiner*—James R. Bidwell
(74) *Attorney, Agent, or Firm*—Young & Thompson

(57) ABSTRACT

A conveying unit with accumulation of containers (6), especially of bottles, includes an accumulation table (2) equipped laterally with guide rails (12, 13) and composed of a juxtaposition of at least one feed conveyor (9) and one accumulation conveyor (10), the containers (6) being routed onto this table (2) at its upstream end via at least one feed transporter, and being discharged on the downstream end via at least one discharge transporter. The unit is characterized in that at least one of the guide rails (12, 13) is equipped with a transverse offset (12a, 13a), composed of a segment of the guide rail (12, 13), with an amplitude (14) of between 0.2 and 0.8 times the diameter D of a container (6) and offset relative to the longitudinal axis (15) of the guide rail (12, 13) by a distance corresponding to the amplitude (14).

10 Claims, 2 Drawing Sheets

CONVEYING UNIT WITH CONTAINER ACCUMULATION

FIELD OF THE INVENTION

This invention relates to the field of conveying containers, especially bottles, and the object is a conveying unit with accumulation of containers, especially of bottles, comprising an accumulation table equipped laterally with guide rails and composed of a juxtaposition of at least one feed conveyor and one accumulation conveyor. The bottles are routed onto this table, at its upstream end, especially via at least one feed transporter, and are discharged on the downstream end via a discharge transporter.

BACKGROUND OF THE INVENTION

In a packaging line for containers of any product, said containers pass through various treatment-stations. Thus, in the particular case of a bottling unit, it is common to have the containers, especially if they are in the form of bottles, pass through a washing unit, under a bottler, then to a labeller and optionally to a packager.

Between these different treatment stations, these containers are moved by transporters designed to adapt themselves to the respective production rhythms of said stations. To do this, it is necessary to form buffer inventories of containers at the level of these intermediate transporters. Moreover, these buffer inventories often make it possible to avoid completely stopping a facility, for example a bottling line, when a station downstream is temporarily stopped for any intervention.

To form such buffer inventories, it is more especially intended that accumulation tables be inserted at the level of the intermediate transporters, tables with a stockpiling capacity that determines, among others, the time available to an operator for intervening in a station downstream without requiring a complete shutdown of the production line. This results in that flexibility of use of the packaging facility is dependent on the container accumulation capacity between two successive treatment units, a large accumulation capacity resulting in high flexibility of use.

Document WO00/41155 describes an accumulation table of this type that is composed of a juxtaposition of transport lines, of which certain ones define a so-called feed conveyor and others that advance more slowly, forming accumulation According to this document, the containers are supplied to the accumulation table at its upstream end via a feed transporter that is directly lengthened by a feed conveyor. When the containers arrive in the downstream part of the table and cannot continue to advance normally, they are automatically pushed back, under the influence of the following containers, toward the accumulation conveyor or conveyors extending from one side or the other of the feed conveyor. This results in an accumulation of containers for forming a buffer inventory.

It should be noted that in the accumulation period per se, the accumulation conveyor or conveyors are stopped. Conversely, when the flow is running normally on the discharge transporter at the downstream end of the table, the accumulation conveyors are moving and advance more slowly than the feed conveyors, as already indicated above.

The speed difference between the feed conveyor or conveyors and the accumulation conveyor or conveyors involves the formation of preferred flows along the table.

It has been found that these preferred flows that are formed more or less systematically in the extension of a feed conveyor are the result of incorrect distribution of the containers on the table, more especially in the accumulation phase. Thus, a container that is located on a feed conveyor and that is in contact with other containers, especially containers distributed on the accumulation conveyors, is exposed, under the influence of the advance of the feed conveyor, to a thrust with an axial component, i.e., in the normal direction of advance of these containers, that is essentially greater than the component that is transverse to the table and thus in the direction of advance.

This results in that these containers that are located on a feed conveyor, following a lateral direction, very easily push back the containers that are located on the accumulation conveyors and, due to the fact that they are advancing more quickly, they prevent integration of these containers located on the feed conveyors into the preferred flux that has been formed in this way.

It has been suggested that these disadvantages be remedied by routing the containers stockpiled on the accumulation table according to a perfect or more or less perfect arrangement of staggered rows, i.e., such that these containers are distributed in rows extending crosswise to the table and consequently advancing abreast. Moreover, the containers that are in contact with one another in a row are arranged in staggered rows with those of the preceding and following rows.

Thus, a container that is not directly juxtaposed to a lateral guide rail comes into contact with the two containers of the preceding row, but likewise with two other containers of the following row. This is followed by a re-alignment of the containers in one direction of roughly 30° relative to the axis of the table, i.e., relative to the direction of advance of the containers. Such a container is exposed to thrusts following the aforementioned 30° angles relative to the longitudinal axis of the table, such that it has a tendency to be pushed back laterally and thus can no longer insert itself into the preferred axial flow. Since a perfect arrangement in staggered rows prevents the presence of empty space between the containers, the containers located on the accumulation conveyors cannot in their turn be pushed back laterally to promote passage of the containers upstream.

This results in that the containers located on the accumulation conveyor or conveyors are naturally pushed downstream from the table without a preferred path for the containers located on the feed conveyor or conveyors being able to be set up.

To eliminate these disadvantages, it has been proposed that a perfect or more or less perfect distribution of the containers in staggered rows on the accumulation table be ensured, by simply providing on one side and/or the other of the table, on the lateral guide rails, one or more baffles with a defined amplitude. Such a solution is described especially in document U.S. Pat. No. 4,623,059.

Via these baffles of a defined amplitude, the containers undergo a modification of their arrangements relative to one another, without, however, producing a blockage; this specifically results in allowing them to assume a distribution under the aforementioned conditions with elimination of the empty space between these containers.

This results in that the containers advance necessarily simultaneously over the entire width of the accumulation table without there being any differentiation between the containers located on the feed conveyors and those located on the accumulation conveyors.

These baffles in the form of a sawtooth tend to promote a blockage of the containers at the bottom of the teeth, however, which results in the necessary adaptation of these baffles to the diameter of the containers. Moreover, providing such added baffles entails a relatively major expenditure of labor and accessories for fixing and adjusting them in position in order to achieve a correct sequence of detours of the containers individually and in order to route them into the main flow according to the predetermined arrangement in staggered rows. Moreover, the very fact of adding these baffles entails additional risks of problems such as deformations or the like and thus the necessity of additional maintenance interventions.

SUMMARY OF THE INVENTION

The object of this invention is to alleviate these problems by suggesting a conveying unit with accumulation of containers, especially of bottles, allowing easy detours of these bottles located near the sides to the main flow, with implementation by simple and reliable means.

To do this, the conveying unit with accumulation of containers, especially of bottles, comprising an accumulation table equipped laterally with guide rails that keep the containers on said table and composed of a juxtaposition of at least one feed conveyor and one accumulation conveyor, the containers being routed onto this table at its upstream end, especially via at least one feed transporter, and being discharged on the downstream end via at least one discharge transporter, is characterized in that at least one of the guide rails is equipped with a transverse offset composed of a segment of said guide rail, with an amplitude of between 0.2 and 0.8 times the diameter D of a container and offset relative to the longitudinal axis of said guide rail by a distance corresponding to said amplitude.

BRIEF DESCRIPTION OF THE DRAWINGS

The invention will be better understood by way of the following description that relates to one preferred embodiment given by way of a nonlimiting example and explained with reference to the attached schematic drawings, in which.

DETAILED DESCRIPTION OF THE INVENTION

Figure 1:
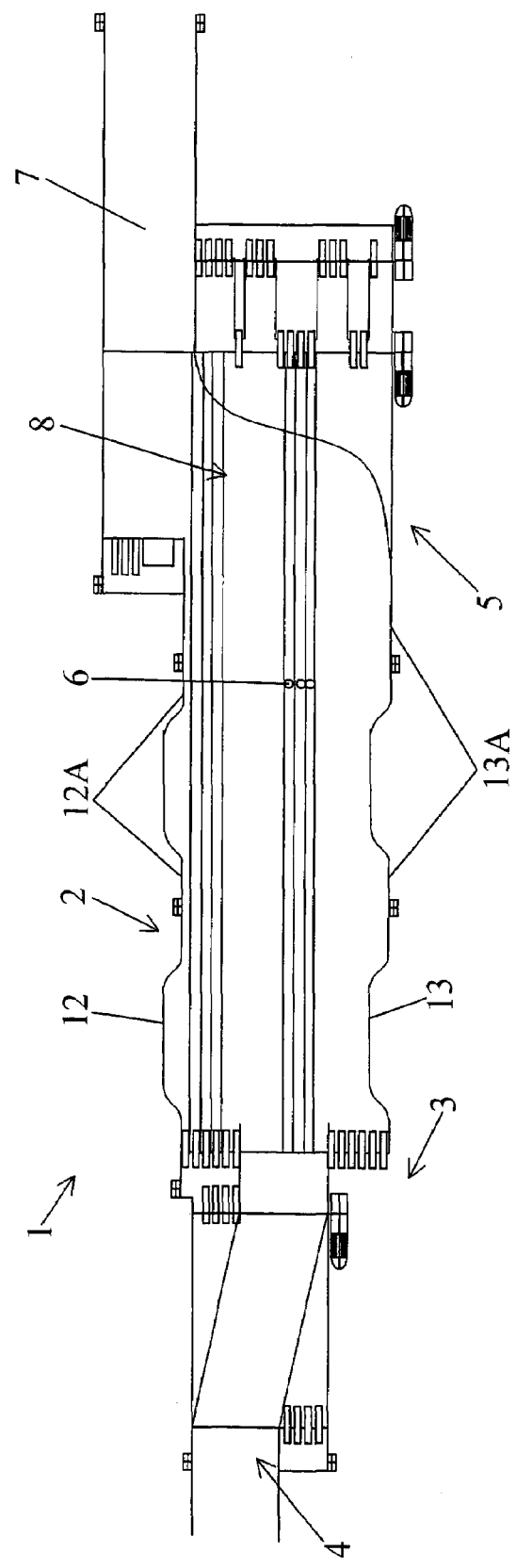
FIG. 1 is a plan view of one conveying unit with accumulation according to the invention.
Figure 2:
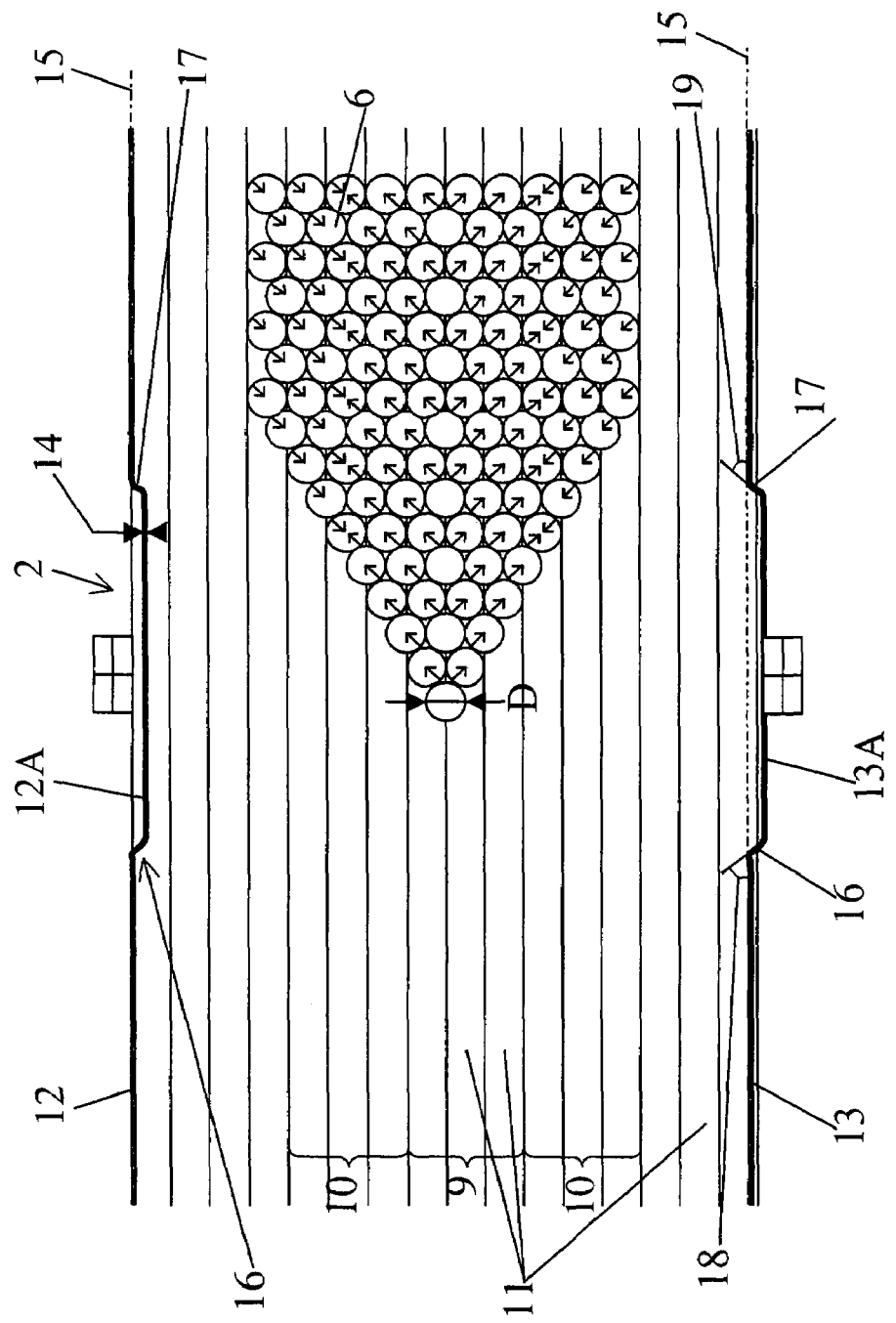
FIG. 2 is a partial plan view, on a larger scale, of the accumulation table showing the containers having been perfectly arranged in staggered rows.

FIG. 1 of the attached drawings shows a conveying unit with accumulation of containers 6, especially of bottles, comprising an accumulation table 2 equipped laterally with guide rails 12, 13 that keep the containers 6 on said table 2, and composed of a juxtaposition of at least one feed conveyor 9 and one accumulation conveyor 10, the bottles 6 being routed onto this table 2 at its upstream end 3 especially via at least one feed transporter 4 and being discharged on the downstream end 5 via at least one discharge transporter 7, if necessary with implementation of a transition conveyor 8. The feed transporter 4 preferably discharges onto a feed conveyor 9 that advances at a speed greater than that of an accumulation conveyor 10.

As an example, the accumulation table 2 can be composed of a juxtaposition of several lines with pallets 11, of which certain ones form a feed conveyor 9 and others form an accumulation conveyor 10, the assignment of these lines with pallets being dependent on the individual rates of advance, i.e., those with the greatest speed are intended to form the feed conveyor 9.

It should be noted that in an accumulation period, the feed conveyor or conveyors 10 are stopped, such that the containers 6 originating from a feed transporter 4 and conveyed by the feed conveyor or conveyors 9 are pushed progressively back laterally and are stockpiled on this or these accumulation conveyors 10.

It should be noted that the invention is not limited to the illustrated configuration. Thus, it is possible to provide several feed transporters 4 in an upstream part 3 of the table 2, as well as several discharge transporters 7 in a downstream part 5.

According to the invention, at least one of the guide rails 12, 13 is provided with a transverse offset 12a, 13a composed of a segment of said guide rail 12, 13, with an amplitude 14 of between 0.2 and 0.8 times the diameter D of a container 6 and offset relative to the longitudinal axis 15 of said guide rail 12, 13 by a distance corresponding to said amplitude 14.

Preferably each guide rail 12, 13 comprises over its length several transverse offsets 12a, 13a distributed over the entire length of the accumulation table 2. These transverse offsets 12a, 13a are advantageously equidistant from one another.

According to another characteristic of the invention, the transverse offsets 12a, 13a of the guide rails 12, 13 are connected to said guide rails 12, 13 by transition zones 16, 17 with a slight incline, which are designed to ensure gentle, low-pressure transfer of containers 6 from the sides of the table 2 toward the center part of the latter and thus toward the feed conveyor 9. Preferably, these transition zones 16, 17 have an angle of inclination 18, 19 of less than 45° relative to the longitudinal axis 15 of the guide rails 12, 13.

According to another characteristic of the invention, the transverse offsets 12a, 13a of the guide rails 12, 13 are aligned crosswise to one another, and in pairs they have an identical transverse offset direction. Thus, to each offset 12a of the rail 12 in the direction of the center axis of the table 2, there corresponds an offset 13a of the rail 13 in the direction that is opposite relative to the axis of the table 2, i.e., this offset 13a is located toward the outside relative to the longitudinal axis 15 of said rail 13.

The invention makes it possible to impart to the containers 6 moving on the table 2, under the action of the transverse offsets 12a, 13a of the guide rails 12, 13, a perfect arrangement in staggered rows, by which said containers 6 advance in the accumulation zone by transverse rows of containers that are perfectly aligned and abutting, the containers 6 of one row being arranged in staggered rows relative to those of the following or preceding row.

This results in that the thrust applied to such a container 6 necessarily has an effect on the two containers 6 that precede it, in directions of roughly 30° relative to the longitudinal axis of the accumulation table 2. Since the preceding containers, moreover, abut one another, they cannot move aside laterally to promote the formation of a preferred flow.

Thus, the invention makes it possible to easily and efficiently solve the problem of conveying and feeding containers in a preferred flow without implementing added, supplementary guide means.

Of course, the invention is not limited to the described embodiment shown in the attached drawings. Modifications remain possible, especially with respect to the composition of the various components or by substitution of technical equivalents, without thereby departing from the field of protection of the invention.

The invention claimed is:

1. Conveying unit with accumulation of containers (6), especially of bottles, comprising an accumulation table (2) equipped laterally with guide rails (12, 13) that keep the containers (6) on said table (2), and composed of a juxtaposition of at least one feed conveyor (9) and one accumulation conveyor (10), the containers (6) being routed onto this table (2) at its upstream end (3), especially via at least one feed transporter (4), and being discharged on the downstream end (5) via at least one discharge transporter (7), characterized in that at least one of the guide rails (12, 13) is equipped with a transverse offset (12a, 13a) composed of a segment of said guide rail (12, 13), with an amplitude (14) of between 0.2 and 0.8 times the diameter D of a container (6) and offset relative to the longitudinal axis (15) of said guide rail (12, 13) by a distance corresponding to said amplitude (14).

2. Conveying unit, according to claim 1, wherein each guide rail (12, 13) over its length comprises several transverse offsets (12a, 13a) distributed over the entire length of the accumulation table (2).

3. Conveying unit according to claim 1, wherein the transverse offsets (12a, 13a) are equidistant relative to one another.

4. Conveying unit, according to claim 1, wherein the transverse offsets (12a, 13a) of the guide rails (12, 13) are connected to said guide rails (12, 13) by transition zones (16, 17) with a slight incline, which are designed to ensure gentle, low-pressure transfer of containers (6) from the sides of the table (2) toward the center part of the latter and thus toward the feed conveyor (9).

5. Conveying unit, according to claim 4, wherein the transition zones (16, 17) have an angle of inclination (18) of less than 45° relative to the longitudinal axis (15) of the guide rails (12, 13).

6. Conveying unit, according to claim 1, wherein the transverse offsets (12a, 13a) of the guide rails (12, 13) are aligned crosswise to one another and in pairs have an identical transverse offset direction.

7. Conveying unit according to claim 2, wherein the transverse offsets (12a, 13a) are equidistant relative to one another.

8. Conveying unit, according to claim 2, wherein the transverse offsets (12a, 13a) of the guide rails (12, 13) are connected to said guide rails (12, 13) by transition zones (16, 17) with a slight incline, which are designed to ensure gentle, low-pressure transfer of containers (6) from the sides of the table (2) toward the center part of the latter and thus toward the feed conveyor (9).

9. Conveying unit, according to claim 2, wherein the transverse offsets (12a, 13a) of the guide rails (12, 13) are aligned crosswise to one another and in pairs have an identical transverse offset direction.

10. Conveying unit, according to claim 3, wherein the transverse offsets (12a, 13a) of the guide rails (12, 13) are aligned crosswise to one another and in pairs have an identical transverse offset direction.

* * * * *